United States Patent
Frank

[15] 3,705,341
[45] Dec. 5, 1972

[54] INVERTER

[72] Inventor: Kjell Frank, Vasteras, Sweden

[73] Assignee: Allmanna Svenska Elektriska Aktiebolaget, Vasteras, Sweden

[22] Filed: May 7, 1971

[21] Appl. No.: 141,175

[30] Foreign Application Priority Data

May 15, 1970 Sweden..............................6689/70

[52] U.S. Cl. .....................................321/5, 321/45 C
[51] Int. Cl. ..............................................H02m 7/48
[58] Field of Search .....................321/5, 45 R, 45 C

[56] References Cited

UNITED STATES PATENTS

| | | | |
|---|---|---|---|
| 3,354,370 | 11/1967 | Conny et al. | 321/45 C |
| 3,487,278 | 12/1969 | Turnbull et al. | 321/45 C |
| 3,331,011 | 7/1967 | Landis | 321/45 C |
| 3,340,457 | 9/1967 | Schmitz | 321/45 C |

Primary Examiner—William M. Shoop, Jr.
Attorney—Jennings Bailey, Jr.

[57] ABSTRACT

An inverter is formed of at least one connection group which is connected to and arranged to be fed from a DC source. Such connection group includes two controlled main rectifiers connected in series with each other between the poles of the DC source, with their connection point forming the output terminal for the output voltage. The rectifiers are ignited alternately. There are also two controlled commutating rectifiers forming in series with each other a part of a connection between the two poles of the DC source and alternately ignited to extinguish the main rectifiers. Between the connection point of the main rectifier and a point in said series connection there is a commutating capacitor. An inductive element is connected with the commutating capacitor to form a series oscillating circuit to recharge the capacitor at each commutation. Limiting rectifiers are connected between each pole of the DC source and the terminal of the commutating capacitor which is connected to the alternating output. The limiting rectifiers have such a polarity that they block for the voltage of the DC source. The inductive element is formed of two reactors each having two windings inductively connected to each other, one of the windings connected in series with a commutating rectifier connected to one pole of the DC source and the other winding in series with a limiting rectifier connected to the other pole of the source.

2 Claims, 2 Drawing Figures

INVENTOR.
KJELL FRANK

INVERTER

BACKGROUND OF THE INVENTION

1. Field of the Invention

The invention relates to an inverter having at least one connection group which is connected to and arranged to be fed from a DC source. Such connection group includes two controlled main rectifiers connected in series with each other between the poles of the DC source, with their connection point forming the output terminal for the output voltage. The rectifiers are ignited alternately. There are also two controlled commutating rectifiers forming in series with each other a part of a connection between the two poles of the DC source and alternately ignited to extinguish the main rectifiers. Between the connection point of the main rectifiers and a point in said series connection there is a commutating capacitor. An inductive element is connected with the commutating capacitor to form a series oscillating circuit to recharge the capacitor at each commutation. Limiting rectifiers are connected between each DC source and the terminal of the commutating capacitor which is connected to the alternating output. The limiting rectifiers have such a polarity that they block for the voltage of the DC source.

2. The Prior Art

Such inverters are already known and an example of one is shown in FIG. 1. A capacitor C1 is connected over the feeding direct voltage U. T13 and T23 are main thyristors, T11 and T21 commutating thyristors and D11 and D21 feed-back and commutating diodes. The operation is as follows: T 13 is assumed to be conducting and carries the load current I (the load is connected to terminal $a$). The capacitor C is then charged with positive potential on the right-hand plate. T11 is ignited, C discharges through T13, T11 and L. The capacitor current increases until it is equal to the load current, whereupon T13 closes and D11 starts to carry current. The capacitor is recharged through D11, T11 and L and when its voltage has reached peak value (positive potential to the left), T11 is extinguished. During the latter part of the commutation process any reactive load current component will flow through D21. When commutation is completed the other main thyristor T23 can be ignited.

However, this connection has several drawbacks. It has been found that energy is supplied to the commutating oscillation circuit (L, C) by the load current so that when the load current is high the capacitor voltage may assume extremely high values which are only limited upwardly by the losses of the oscillation circuit. This means that, particularly with inverters for high voltage, there are extremely high voltage stresses on the thyristors and also that an abandantly dimensioned capacitor is required, from the voltage point of view.

The blocking voltage over the main thyristors during their recovery time will not be greater than the voltage drop over the diodes D11, D21, that is only a volt or so greater. The recovery time, that is the time from when the load current ceases through a thyristor until it can once again take up voltage in the conducting direction, is strongly dependent on the magnitude of the reverse blocking voltage during this interval and it will therefore be long in this known connection. Certain devices are known to eliminate this drawback, but they are either complicated, require considerable power or are not very effective.

SUMMARY OF THE INVENTION

These disadvantages are eliminated with an inverter according to the invention. It is characterized by fact that the inductive element comprises two reactors, each having two windings connected inductively to each other, each reactor having one winding connected in series with a commutating rectifier connected to one pole of the direct voltage source and the other winding in series with the limiting rectifier connected to the other pole of the source.

BRIEF DESCRIPTION OF THE DRAWINGS

The invention will be further described with reference to the accompanying drawings.

DESCRIPTION OF THE PREFERRED EMBODIMENT

Figure 1:
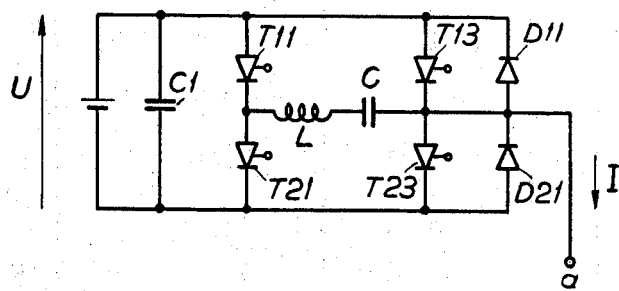
FIG. 1 shows a previously known inverter, described above.
Figure 2:
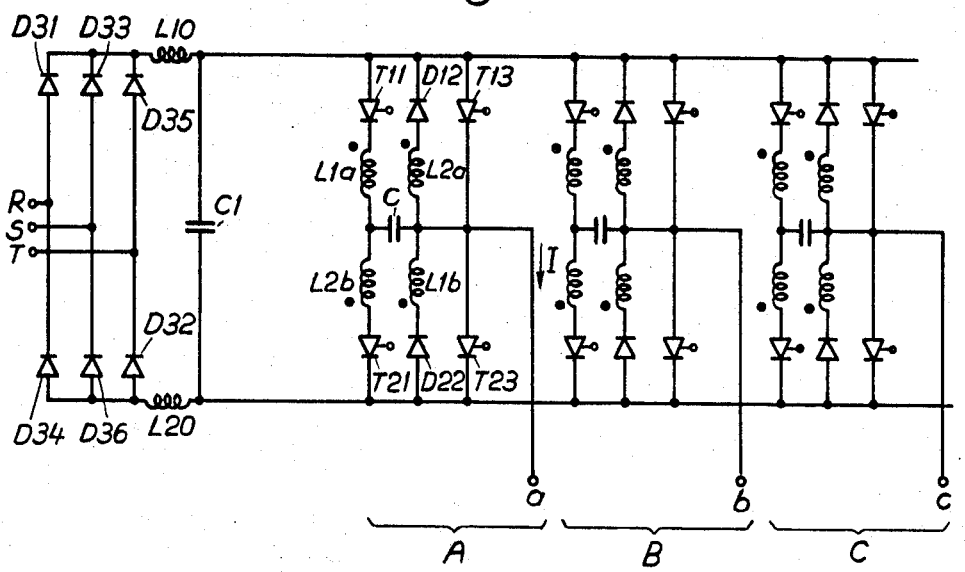
FIG. 2 shows a three-phase inverter according to the invention, fed from an uncontrolled rectifier.

In FIG. 2 the diodes D31 – D36 form an uncontrolled three-phase rectifier which is connected to a three-phase network R, S, T, the voltage of which is smoothed by the reactors L10 and L20 and the capacitor C1. The voltage across the capacitor is supplied to the inverter itself.

The inverter itself consists of three identical phase groups A, B and C, each provided with an alternating voltage output ($a, b, c$). A control device, known per se and not shown for the sake of simplicity, is arranged in known manner with a certain frequency to alternately ignite the main thyristors T13 and T23 in each phase group, alternately at 180° intervals, the alternating output voltage of the phase group, being then alternately connected to the positive and negative poles of the feeding voltage. The phase groups A, B, C are controlled in known manner with 120° phase displacement so that the rectangular-shaped alternating voltages at the outputs $a, b, c$ will be 120° phase displaced and will form a symmetrical three-phase system. Since the three phase-groups operate in exactly the same way, only one phase group A is described here. This comprises the main thyristors T13 and T23 which are connected to the supply voltage. In order to extinguish one conducting main thyristor before the other main thyristor is ignited, a commutating circuit is arranged consisting of the commutating thyristors T11 and T21, the commutating capacitor C and the commutating reactors L1 and L2. Each of the reactors has two windings coupled inductively to one another. L1 has the windings L1a, connected in series with T11, and L1b, in series with a limiting diode D22, L2 has the windings L2a in series with a limiting diode D12 and L2b, in series with T21. The directions of the voltages simultaneously induced in both windings of a reactor are shown by the dots marked beside the windings. The coupling between the two windings in each reactor should be as satisfactory as possible.

In FIG. 2 there are two entirely separate reactors. One, L1, has two windings, L1a and L1b. The other reactor, L2, has two windings, L2a and L2b. The windings are so wound that the sign of the voltage induced is the same at the dotted ends of the winding, that is, with a positive voltage upwards in winding L1a, there is also a positive voltage downwards in L1b. The sum of the currents flowing into the dotted ends of the two windings will therefore tend to be constant and cannot change instantaneously. However, the distribution of current between the windings can change instantaneously. All this is well known from elementary circuit theory.

For instance, at a certain moment the current through L1a may be I and the current through L1b zero. If the flow of current through L1a is suddenly stopped, the current through L1b will instantaneously assume the valve I. This transfer of current from one winding to another does not change the magnetic energy of the reactor L1, which is why the instantaneous transfer is possible.

Assume now T13 to be conducting. Load current flows from the positive supply pole through T13 and output $a$ to the load. C is charged positive on the right-hand plate. No other rectifiers conduct in phase group "A."

When turn-off of T13 is desired, T11 is fired. The right-hand plate of C is at positive supply potential as long as T 13 is conducting. No current will therefore flow through D12 or D22. C drives an increasing current from positive supply through T11, L1a and C and out to the load. As the load current may be assumed constant during the short commutation interval, this means that the current through T13 will decrease by the same amount that the T11, L1a, C current increases. When the latter current reaches the valve of the load current, the T13 current is zero and T13 turns off. The magnetic energy in L1 causes the T11, L1a, C current to continue in the same direction as before, all the time tending to reverse the initial charge on C. As the current through L1a, C is larger than the load current, at least part of this current will now flow from C through L2a and D12. L2a will thus during this interval be a part of the oscillatory circuit for rerersal of the C charge. When the voltage across C (positive on the left-hand plate) becomes equal to the supply voltage, T11 will start to be reverse biased. This will cause T11 to be turned off and the T11, L1a, C current to be instantaneously transferred to D22, L1b. As stated above, this transfer from L1a to L1b involves no change in magnetic energy of reactor L1. The fact that the transfer is instantaneous causes the C voltage to be always locked at exactly the valve of the supply voltage, independently of the load current, which always tries to inject energy into the oscillatory circuit L1a, C, thereby tending to increase the C voltage.

The load current will now continue to flow from negative supply pole through D22 and L1b to the load. The magnetic energy of L1 will tend to continue this current and the energy in L1 will therefore at least partly be fed back to the supply. The same applies to the L2 energy.

The capacitor is now charged to the supply voltage with positive polarity to the left. It is therefore ready for the next commutation, that is turn-off of T23. As neither T11 nor T21 are now conducting, the capacitor charge will remain constant.

D22 will continue to carry current as long as the combined inductive energy of the load and L1 can drive current against the supply voltage. D22 will then become reverse biased and stop conducting.

The turn-off cycle of T13 is now complete.

T23 is turned on at a suitable moment in order to supply a negative half-period of voltage to the load. When T23 is to be turned off, T21 is fired. C will drive an increasing current through C, L2b and T21. When this current reaches the value of the load current, T23 will be turned off. The current path will now be through C, L2b, D22, L1b. When the voltage across C is reversed (positive to the right) and equal to the supply voltage, T21 becomes reverse biased and is turned off and the magnetic energy of L2 causes D12 to start conducting. The magnetic energy of L1 and L2 is fed back to the source (current path D22, L1b, L2a, D12) and possibly to the load.

T13 can be fired at a suitable moment and we are back where we started, with C ready for turn-off of T13.

The functions of the coupled windings are a. to transfer the oscillatory current away instantaneously from the charging path of C at the moment the C voltage is reversed and has reached the supply voltage value. Hereby the C voltage is locked exactly to the supply voltage value. In prior devices, however, the inductances will continue to charge the capacitor even after the capacitor voltage has reached the supply voltage value. The capacitor voltage of such arrangements will therefore be load-dependent with a considerable overcharge at high loads. This is entirely avoided by the present invention.

b. to work as an ordinary reactor when only one of the windings is carrying current, thereby effecting the oscillatory reversal and recharging of the C voltage, and effecting a reverse blocking voltage for fast turn-off of the main rectifiers.

The inverters shown are three-phase, but phase groups in accordance with the invention can of course be composed of inverter connections with arbitrary phase number. Thus, for example, two such groups may be combined into a single phase inverter.

The control device has not been described in detail, but may be constructed in a great number of known ways or ways obvious to one skilled in the art. Thus, for example, an oscillator may be arranged to trigger a ring counter or the like six stable positions (for a three-phase connection), which distributes the ignition pulses to the six main thyristors of the inverter. Possibly the commutating thyristors may be ignited from the ring counter and delay circuits be arranged between each commutating thyristor (for example T11) and the main thyristor (T23), which is to carry current after the commutation in such a way that each main thyristor is ignited a certain time, suitably selected for the commutating process, after the corresponding commutating thyristor. By making the control pulse frequency variable, variable frequency is obtained in the output voltage of the inverter and it can then be used, for example, to control the speed of an asynchronous motor. The output voltage is suitably controlled, when necessary, by some form of pulse length modulation.

I claim:

1. Inverter comprising at least one connection group which is connected to and arranged to be fed from a DC source, each connection group comprising
   two controlled main rectifiers, in series with each other, connected between the two poles of the DC source, their connection point forming the output terminal for the output voltage of the inverter, and a control device arranged to ignite these rectifiers alternately,
   two controlled commutating rectifiers which, in series with each other, form part of a series connection connected between the two poles of the DC source, and a control device arranged to ignite the commutating rectifiers alternately to extinguish the main rectifiers,
   a commutating capacitor connected between the connection point of the main rectifiers and a point in said series connection situated between the commutating rectifiers,
   at least one inductive element arranged, together with the commutating capacitor, to form a series oscillating circuit to recharge the capacitor at each commutation, and
   limiting rectifiers connected between each pole of the DC source and the terminal of the commutating capacitor facing the alternating voltage output, said limiting rectifiers having such polarity that they block for the voltage of the DC source,
in which
   the inductive element comprises two reactors, each having two windings connected inductively to each other, each reactor having one winding connected in series with a commutating rectifier connected to one pole of the direct voltage source and the other winding in series with the limiting rectifier connected to the other pole of the source.

2. Inverter according to claim 1, in which the limiting rectifiers comprise uncontrolled rectifiers.

* * * * *